United States Patent
Creger et al.

(10) Patent No.: US 6,208,925 B1
(45) Date of Patent: Mar. 27, 2001

(54) SIMPLIFIED POWERTRAIN LOAD PREDICTION METHOD AND SYSTEM USING COMPUTER BASED MODELS

(75) Inventors: Todd D. Creger, Metamora; James T. Ferrier, Washington, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/299,544

(22) Filed: Apr. 26, 1999

(51) Int. Cl.[7] ................. G06F 7/00; G06G 7/76
(52) U.S. Cl. ................. 701/51; 701/50; 701/58; 701/59; 172/3
(58) Field of Search .................. 701/51, 53, 54, 701/57, 58, 59, 102, 101, 84, 68, 50, 104; 477/101, 105, 110, 97, 130, 143, 155; 73/117.3, 118.2, 117; 172/2, 4.5, 7; 37/348, 443, 347; 414/699; 702/174

(56) References Cited

U.S. PATENT DOCUMENTS

| | | | |
|---|---|---|---|
| 4,495,577 | * | 1/1985 | Strunk et al. ............... 701/50 |
| 4,680,959 | | 7/1987 | Henry et al. ................. 73/117 |
| 4,896,640 | | 1/1990 | Pfalzgraf et al. ............. 123/399 |
| 5,123,302 | | 6/1992 | Brown et al. ................ 477/154 |
| 5,184,527 | | 2/1993 | Nakamura .................. 477/110 |
| 5,321,637 | * | 6/1994 | Anderson et al. ............. 702/174 |
| 5,377,112 | | 12/1994 | Brown, Jr. et al. ........... 701/115 |
| 5,404,661 | * | 4/1995 | Sahm et al. .................. 37/348 |
| 5,668,727 | | 9/1997 | Pellerito et al. .............. 701/105 |
| 5,848,371 | * | 12/1998 | Creger ....................... 701/101 |
| 5,941,921 | * | 8/1999 | Dasys et al. ................. 701/50 |
| 5,974,352 | * | 10/1999 | Shull ......................... 701/50 |

* cited by examiner

*Primary Examiner*—Jacques H. Louis-Jacques
(74) *Attorney, Agent, or Firm*—Haverstock, Garrett & Roberts; Steve D. Lundquist

(57) ABSTRACT

A simplified method and system for determining a loading condition on a powertrain of a machine resulting from a loading condition on an implement thereof. The method includes the steps of inputting a predetermined plurality of parameter signals representative of the loading condition on the implement into an implement loading model to determine a plurality of implement loading modeled values as a function of the inputted loading parameter signals and inputting the implement loading modeled values into a kinematic linkage model to determine a plurality of modeled linkage loading values as a function of the inputted implement loading modeled values and a plurality of known linkage parameter values and inputting the modeled linkage loading values into a machine powertrain loading model to determine a plurality of powertrain loading modeled values indicative of the loading condition on the powertrain.

20 Claims, 3 Drawing Sheets

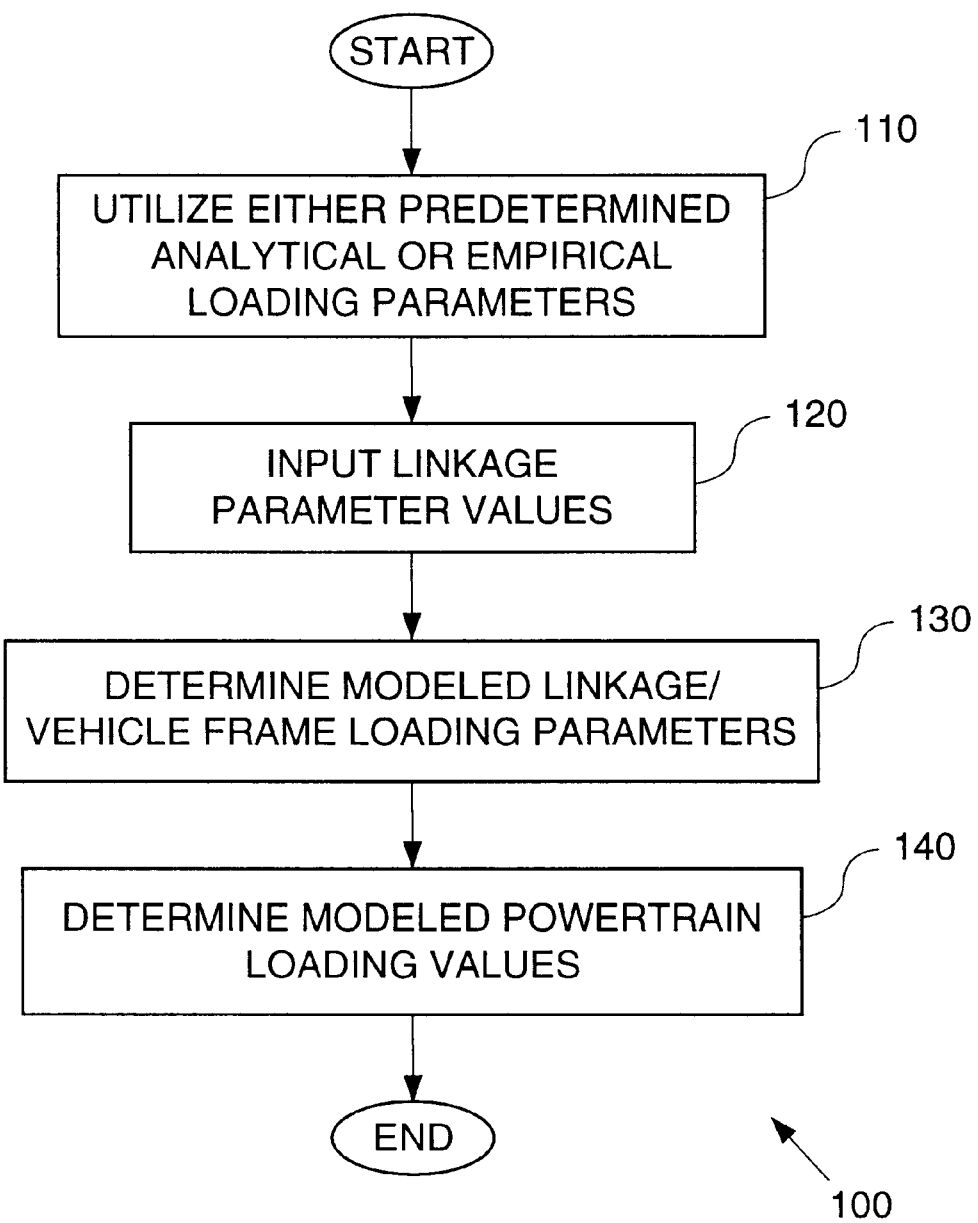

US 6,208,925 B1

SIMPLIFIED POWERTRAIN LOAD PREDICTION METHOD AND SYSTEM USING COMPUTER BASED MODELS

TECHNICAL FIELD

This invention relates generally to a simplified method and system for determining torques and speeds of a powertrain for a machine resulting from predetermined loading conditions on an implement thereof, and more particularly, to a method and system for determining torques and speeds of a powertrain for a machine resulting from an implement loading condition using computer based models.

BACKGROUND ART

Currently, methods for simulating/predicting powertrain loading conditions such as component torques and speeds, involve creating a model of the machine powertrain system, the machine operator or control inputs, and the operating environment or duty cycle. Commonly referred to as "forward-solved" techniques, the machine response is governed primarily by the operator commands and the load imposed on the machine. When using such models, estimates are required regarding the machine operator's control inputs to "drive" the machine powertrain system in a manner representative of the desired operating work cycle. A limitation of this aspect of the forward-solved techniques is that it involves an iterative process wherein initial input commands are selected and subsequently modified until the desired response is achieved. Furthermore, to get accurate force determinations for the implement, a significant amount of model detail is typically required, which in turn often makes the model very sophisticated and complicated so as to require simulation experts for operation. Naturally, as a byproduct of the sophistication and complexity of these models, the alteration of these models is a very involved process. As a consequence, load prediction modeling using the known forward-solved methods is typically very time consuming, making them impractical for many applications.

Accordingly, the present invention is directed to overcoming one or more of the problems as set forth above.

DISCLOSURE OF THE INVENTION

In one aspect of the present invention, a simplified method for determining a loading condition on a powertrain of a machine as a result of a loading condition on an implement thereof is disclosed. The present method includes the step of inputting a predetermined plurality of parameter signals representative of a loading condition on the implement into an implement loading model and responsively determining a plurality of implement loading modeled values. The method further includes the steps of inputting the implement loading modeled values into a kinematic linkage model and responsively determining a plurality of modeled linkage loading values as a function of the inputted implement loading modeled values and a plurality of known linkage parameter values and, inputting the modeled linkage loading values into a machine powertrain loading model to determine a plurality of powertrain loading modeled values indicative of the loading condition on the powertrain.

In another aspect of the present invention, a system for determining a loading condition on a powertrain of a machine resulting from a loading condition on an implement thereof using computer based models is disclosed. An electronic controller is utilized for inputting a predetermined plurality of parameter signals representative of the loading condition on the implement into an implement loading model to determine a plurality of implement loading modeled values as a function of the inputted loading parameter signals. The electronic controller is further utilized for inputting the implement loading modeled values into a kinematic linkage model to determine a plurality of modeled linkage loading values as a function of the inputted implement loading modeled values and a plurality of known linkage parameter values, and for inputting the modeled linkage loading values into a machine powertrain loading model to determine a plurality of powertrain loading modeled values indicative of the loading condition on the powertrain.

BRIEF DESCRIPTION OF THE DRAWINGS

FIG. 3 is a flow diagram illustrating the method of the present invention.

BEST MODE FOR CARRYING OUT THE INVENTION

Figure 1:
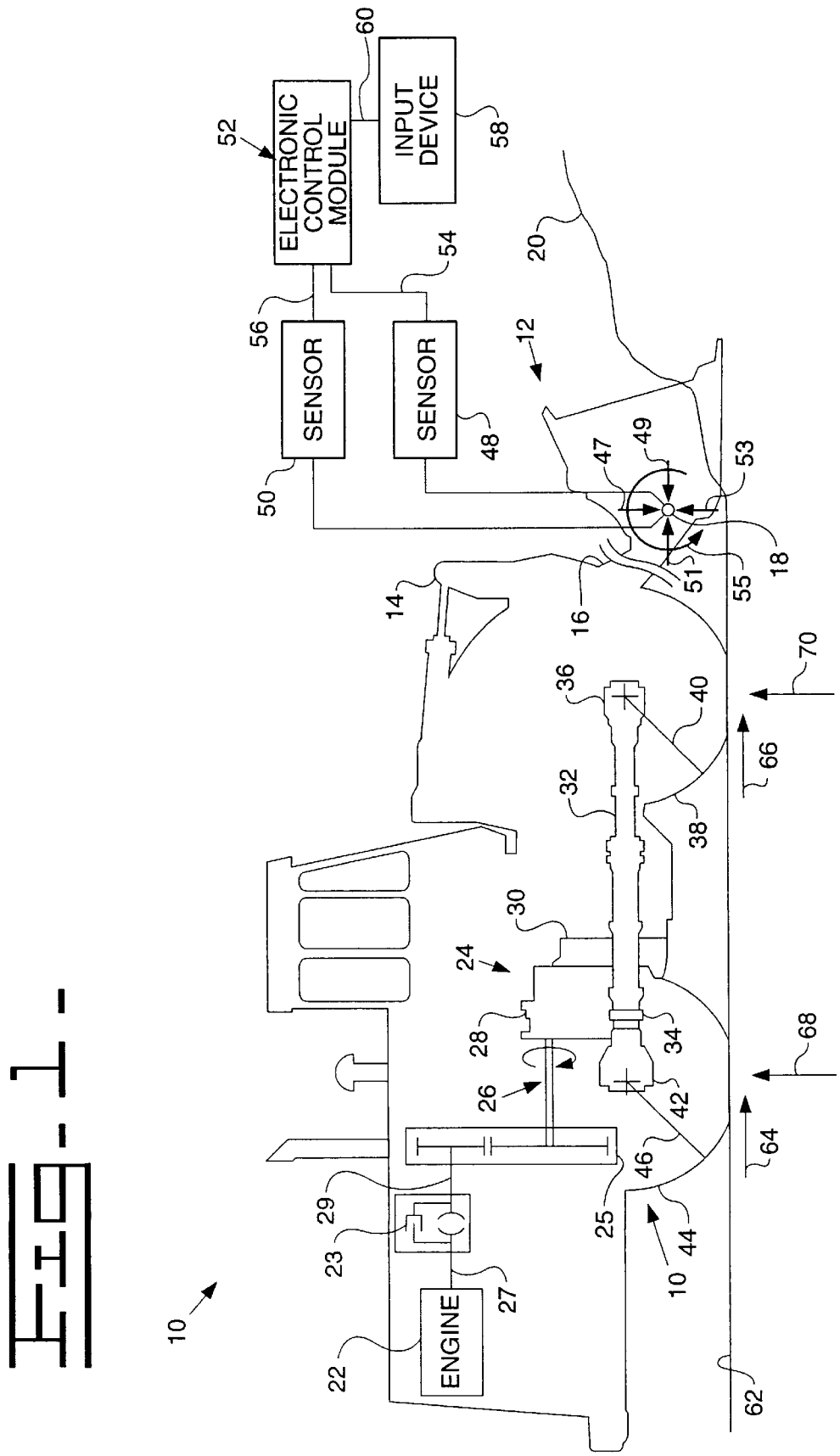
FIG. 1 is a diagrammatic representation of a machine including an implement under a loading condition, a powertrain and a computer for performing the present invention.

With reference to FIG. 1, a machine 10 which is a typical front end loader of well known construction and operation is shown. Machine 10 includes an implement 12 which is a conventional bucket defining a bucket interior having known dimensions and volume mounted to machine 10 by a linkage arrangement 14 including a link 16 connected to implement 12 at pivot point 18, linkage arrangement 14 being operable for manipulating implement 12 for digging and picking up material from a material pile 20 and like functions in a conventional manner. Machine 10 further includes a conventionally constructed and operable internal combustion engine 22 connected in driving relation to a powertrain 24 via a torque converter 23 to an input transfer gear 25. The output of the input transfer gear 25 is attached to the transmission input shaft 26 of a transmission 28 of the powertrain 24. Transmission 28, in turn, is drivingly connected to a transfer unit 30 drivingly connected to a front drive shaft 32 and a rear drive shaft 34, front drive shaft 32 being connected in driving relation to a front drive axle assembly 36 for driving a pair of front wheels represented at 38 having a rolling radius 40. In turn, rear drive shaft 34 is drivingly connected to a rear drive axle assembly 42 drivingly connected to a pair of rear wheels represented at 44 and having a rolling radius 46.

The present method is operable for determining torques and speeds of various components of powertrain 24, such as, but not limited to, torque and speed on transmission input shaft 26, engine driveshaft 27, torque converter output shaft 29, as a result of predetermined loading conditions on implement 12, such as, but not limited to, digging and picking up material from material pile 20. Here, it should be understood that material pile 20 could comprise a wide variety of materials having different per unit weights, such as soil, gravel, snow and the like. Depending on the nature of the predetermined digging, lifting and otherwise moving or interacting with such different materials with implement 12 parameters will result in different torques and speeds for the powertrain 24 and associated components.

If the loading parameters are obtained empirically, according to the present method, a plurality of sensors represented by sensors 48 and 50 which are a force sensor and an accelerometer, respectively, are provided for sensing a plurality of parameters of the loading conditions of implement 12 in real time during a loading operation. Here, the loading operation is represented by digging or scooping material from material pile 20 and lifting the material. Force sensor 48 is operable for sensing forces during the operation of implement 12 and responsively producing and communicating signals representative of the forces to a electronic control module 52 over wire 54. The force vector on the implement 12 in the x-direction is represented by numeral 49 and the force vector on the implement 12 in the y-direction is represented by numeral 47. Similarly, accelerometer 50 is operable for sensing acceleration of portion of implement 12 and responsively producing and communicating signals representative thereof over wire 56 to electronic control module 52, although it should also be recognized that some parameters such as acceleration can also be derived mathematically from other parameters such as displacement and speed when known. The acceleration vector on the implement 12 in the x-direction is represented by numeral 51 and the acceleration vector on the implement 12 in the y-direction is represented by numeral 53. The force and acceleration of the implement 12 is a function of implement geometry, type of material in the material pile 20, rimpull/speed characteristics, traction limit, lift and tilt force limits, maximum rack speed and the individual technique of the operator utilizing the implement 12. Rimpull is the tractive force that the machine 10 is able to generate. Maximum rack speed is equivalent to the maximum tilt speed of the implement 12. The equivalent moment 55 produced by the force for the implement 12 is defined as the product of the resultant force vector of the force vector in the x-direction 49 and the force vector in the y-direction 47 times the perpendicular distance from the pivot pin 18.

Additionally, an optional input device 58 is shown connected to electronic control module 52 via wire 60 for inputting more loading parameters into electronic control module 52 including, but not limited to such parameters as implement type, size, and geometry, material characteristics, such as weight per unit volume, rimpull/speed curve maps and traction limit maps for wheels 38 and 44, lift and tilt force limits for implement 12, rack speed limits, and implement operating style information. Additional computations that are utilized can include, but are not limited to, rear rimpull 64, front rimpull 66, rear axle force 68 between wheel 44 and a surface 62 on which machine 10 is located during the loading operation and a front axle force 70 between wheel 38 and a surface 62 on which machine 10 is located during the loading operation.

Figure 2:
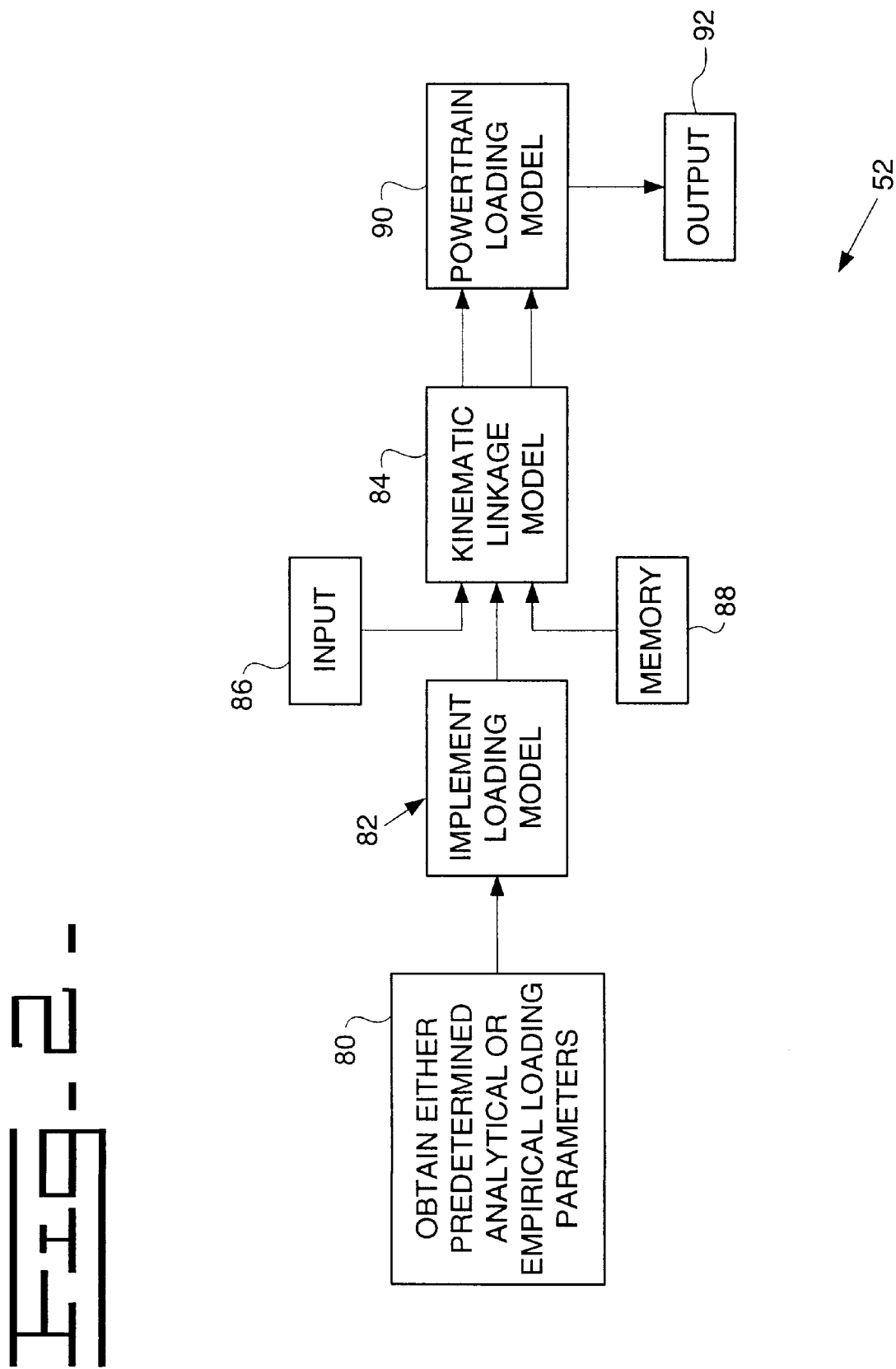
FIG. 2 is a block diagram showing information flow according to the present invention.

Referring to FIG. 2 as well as FIG. 1, the electronic control module 52 can include, but is not limited to, a processor such as a microprocessor, however, any of a wide variety of computing devices will suffice. The electronic control module 52 preferably includes, but is not limited to, a memory device and a clock, and is representative of both floating point processors, and fixed point processors.

The electronic control module 52 can utilize previously received empirical data in the form of parameter signals from sensors 48 and 50, and/or analytical data from an optional input device 58 as shown by numeral 80. This empirical and/or analytical data is then inputted into an implement loading model 82 operable to determine modeled values for forces on implement 12, moments, and displacements thereof, using simple conventional equations such as the force equation F=M×A, wherein F equals a force to be determined, M equals a mass, and A equals acceleration. Therefore, the total force is equal to the summation of the rear rimpull force 64 and the front rimpull force 66 minus the summation of the force vector of the implement 12 in the x-direction 49 and the force vector of the implement 12 in the y-direction 47. This value for total force is equal to the mass M times the vector summation of the acceleration of implement 12 in the x-direction and the acceleration of implement 12 in the y-direction. $F_{rimpull} - F_{implement} = M \times A_{implement}$. It is important to keep in mind that data can be two dimensional or three dimensional.

The modeled values are then inputted into a kinematic linkage model 84 along with inputs relating to linkages connecting implement 12 with machine 10, such as, but not limited to, dimensions and angular orientations of link 16 and other components of linkage arrangement 14 which can be inputted using input device 86 or stored in electronic control module 52 in a memory device as represented at 88. Kinematic linkage model 84 then determines a plurality of modeled linkage loading values, including, but not limited to, linkage forces and displacements using simple conventional kinematic and force equations.

The determined modeled linkage loading values are then inputted into a powertrain loading model 90 operable to determine powertrain loading modeled values indicative of the loading condition on elements of the powertrain based on known geometric relationships between the various components of machine 10, including implement 12, linkage arrangement 14, and powertrain 24, again using simple, conventional force and kinematic equations. These powertrain loading modeled values are then delivered to an output 92.

A basic relationship is that the summation of torque is equal to the angular inertia times the angular acceleration of the powertrain 24. $\Sigma T = I \cdot A$. As merely an illustrative, but nonlimiting example, torque acting on transmission input shaft 26 ($T_{trans\_in}$) is a function of the gear ratios between shaft 26 and front drive axle assembly 36 and/or rear drive axle 42 (depending on whether the respective drive axles are engaged), the combination of the rear rimpull force 64 at the contact point between the pair of rear wheels 44 and the surface 62 and the front rimpull force 66 at the contact point between the pair of front wheels 38 and the surface 62 ($F_{rimpull}$), the radii 40 and 46 of wheels 38 and/or 44, and other factors, such as slippage of wheels 38 and 44 relative to surface 62, as shown by the following equation $$(T_{trans\_in} \times \text{gear ratio}) - (F_{rimpull} \times \text{wheel radius}) = I \times \text{Alpha}_{wheel}$$

where I is a calculation based on predetermined lumped inertial constants; gear ratio is the total gear reductions between the input shaft 26 and the drive axle assembly or assemblies 36 and 42; $F_{rimpull}$ is the rimpull force at involved pair of front wheels 38 and/or pair of rear wheels 44; and Alpha$_{wheel}$ is the rotational acceleration of the involved wheel (sensed or determined mathematically). Alpha$_{wheel}$ is a function of the acceleration of the implement 12 in the x-direction 51 and the acceleration of the implement 12 in the y-direction 53 and wheel slip.

The powertrain load prediction software will now be discussed with reference to FIG. 3, which depicts a flowchart 100 representative of the computer program instructions executed by the electronic control module 52 shown in FIG. 2. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number. At program step <110>, predetermined analytical or loading parameters of the loading condition on implement 12, for instance, force, acceleration, and the like, are produced. The predetermined parameter signals are then inputted into the implement loading model to determine modeled implement loading values such as forces, moments, and displacements <120>. Then, the implement loading modeled values and a plurality of linkage/machine frame parameter values are inputted into the kinematic linkage model to determine the modeled linkage loading values, as shown at program steps <130>. The modeled linkage values are then inputted into the powertrain loading model to determine a plurality of powertrain loading modeled values indicative of the loading condition on the powertrain, as illustrated at program step <140>.

Industrial Applicability

The present method for determining a loading condition on a powertrain of a machine resulting from a loading condition on an implement thereof provides a backward-solved approach that substantially simplifies the model development process as compared to the more traditional forward-solved approaches. This backward-solved approach can be utilized during the entire work cycle and is optimally utilized during the digging portion of the work cycle with traditional forward-solved techniques utilized for the remainder of the work cycle. It is notable that the present method is based solely on a predetermined knowledge of empirical or analytical loading parameters such as forces and accelerations acting on the implement, and simple information such as implement dimensions, wheel radii, linkage dimensions, gear ratios, and the like, without additional information regarding operator control inputs. Thus, the present method provides a simpler, easier to use modeling technique that can be used by a larger community of designers and analysts with a software program that is faster than typical simulation and general integrator model programs. Further, since operator commands are not a required input, the extended and cumbersome iterations associated with the forward-solved approaches are not required.

Other aspects, objects and advantages of the present invention can be obtained from a study of the drawings, the disclosure and the appended claims.

What is claimed is:

1. A method for determining a loading condition on a powertrain of a machine resulting from a loading condition on an implement thereof using computer based models, comprising the steps of:
   inputting a predetermined plurality of parameter signals representative of said loading condition on said implement into an implement loading model, and responsively determining a plurality of implement loading modeled values;
   inputting said implement loading modeled values into a kinematic linkage model, and responsively determining a plurality of modeled linkage loading values as a function of said inputted implement loading modeled values and a plurality of known linkage parameter values; and
   inputting said modeled linkage loading values into a machine powertrain loading model, and responsively determining a plurality of powertrain loading modeled values indicative of said loading condition on said powertrain.

2. The method, as set forth in claim 1, wherein said parameters of said loading condition on said implement comprise parameters selected from the group consisting of implement dimensions, loading material, machine speed, traction limits, force limits, rack speed, and implement operating style.

3. The method, as set forth in claim 1, wherein said predetermined parameters of said loading condition on said implement are determined by analytical methods.

4. The method, as set forth in claim 1, wherein said predetermined parameters of said loading condition on said implement are determined by empirical methods.

5. The method, as set forth in claim 1, wherein said implement loading modeled values comprise values selected from the group consisting of force values, moment values, and displacement values.

6. The method, as set forth in claim 1, wherein said modeled linkage loading values comprise linkage forces and linkage displacements.

7. The method, as set forth in claim 6, wherein said linkage forces and linkage displacements are developed from kinematic equations.

8. The method, as set forth in claim 6, wherein said linkage forces and linkage displacements are developed from force equations.

9. The method, as set forth in claim 1, wherein said powertrain loading modeled values comprise torque values and speed values.

10. The method, as set forth in claim 7, wherein said powertrain loading modeled values are three dimensional.

11. A system for determining a loading condition on a powertrain of a machine resulting from a loading condition on an implement thereof using computer based models, comprising:
    an electronic controller for inputting a predetermined plurality of parameter signals representative of said loading condition on said implement into an implement loading model to determine a plurality of implement loading modeled values as a function of said inputted loading parameter signals and for inputting said implement loading modeled values into a kinematic linkage model to determine a plurality of modeled linkage loading values as a function of said inputted implement loading modeled values and a plurality of known linkage parameter values and for inputting said modeled linkage loading values into a machine powertrain loading model to determine a plurality of powertrain loading modeled values indicative of said loading condition on said powertrain.

12. The system, as set forth in claim 11, wherein said parameters of said loading condition on said implement comprise parameters selected from the group consisting of implement dimensions, loading material, machine speed, traction limits, force limits, rack speed, and implement operating style.

13. The system, as set forth in claim 11, wherein said predetermined parameters of said loading condition on said implement are determined by analytical methods.

14. The system, as set forth in claim 11, wherein said predetermined parameters of said loading condition on said implement are determined by empirical methods.

15. The system, as set forth in claim 11, wherein said implement loading modeled values comprise values selected from the group consisting of force values, moment values, and displacement values.

16. The system, as set forth in claim 11, wherein said modeled linkage loading values comprise linkage forces and linkage displacements.

17. The system, as set forth in claim 16, wherein said linkage forces and linkage displacements are developed from kinematic equations.

18. The system, as set forth in claim 16, wherein said linkage forces and linkage displacements are developed from force equations.

19. The system, as set forth in claim 11, wherein said powertrain loading modeled values comprise torque values and speed values.

20. The system, as set forth in claim 19, wherein said powertrain loading modeled values are three dimensional.

* * * * *